May 23, 1961 — H. E. BOWERMAN — 2,985,195
QUICK ACTING CLUTCH TUBE
Filed Jan. 13, 1958 — 2 Sheets-Sheet 1
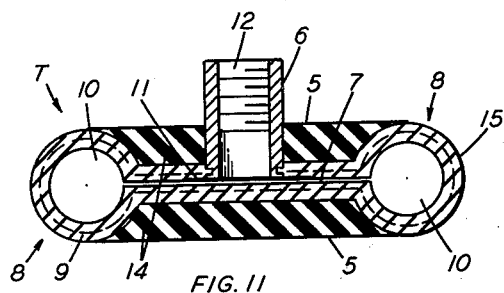
FIG. II
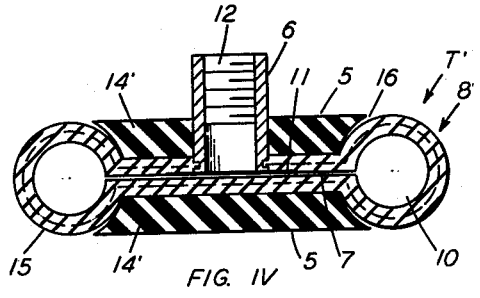
FIG. IV
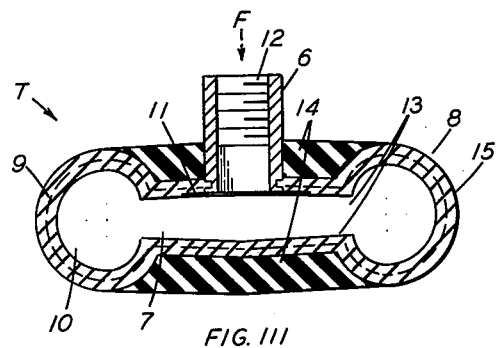
FIG. III
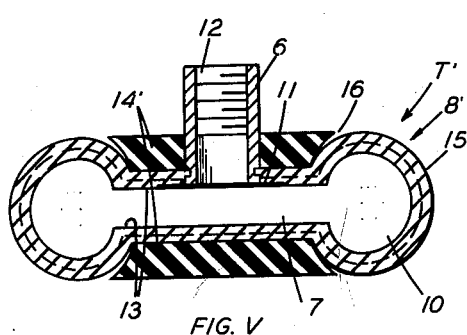
FIG. V
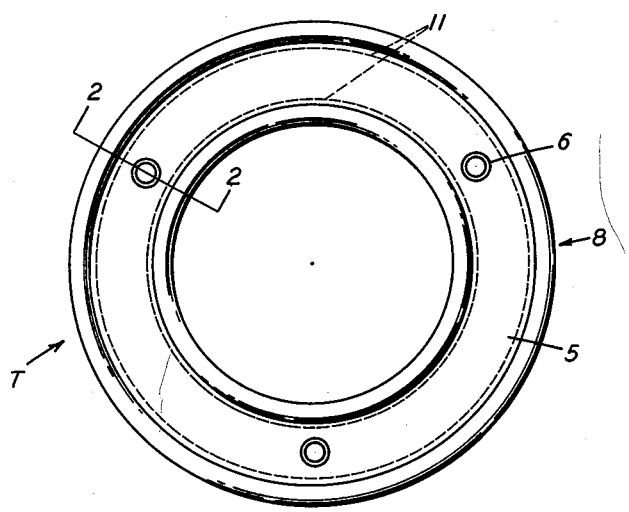
FIG. I
INVENTOR.
HULIE E. BOWERMAN
BY
ATTORNEY May 23, 1961   H. E. BOWERMAN   2,985,195
QUICK ACTING CLUTCH TUBE
Filed Jan. 13, 1958   2 Sheets-Sheet 2
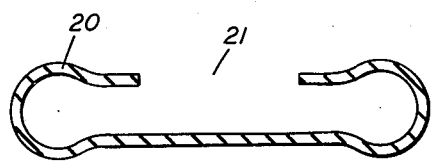
FIG. VII
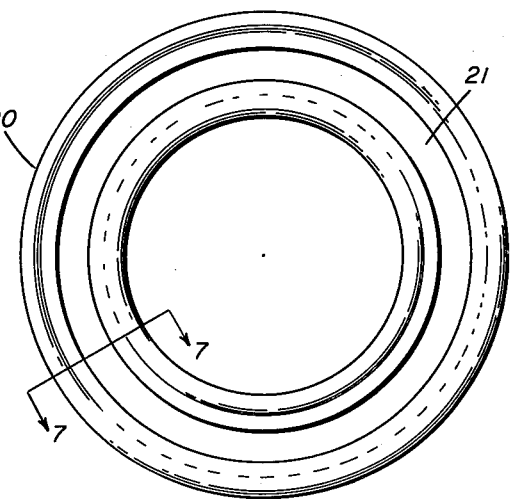
FIG. VI
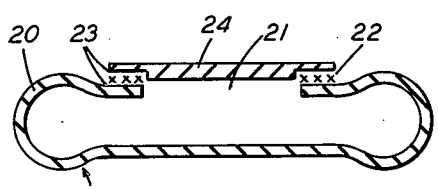
FIG. VIII
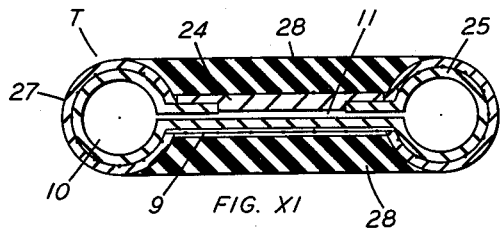
FIG. XI
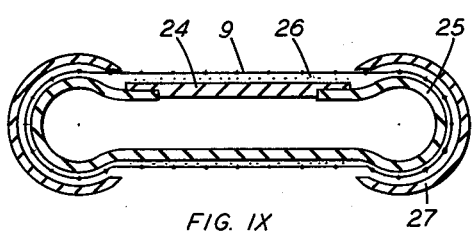
FIG. IX
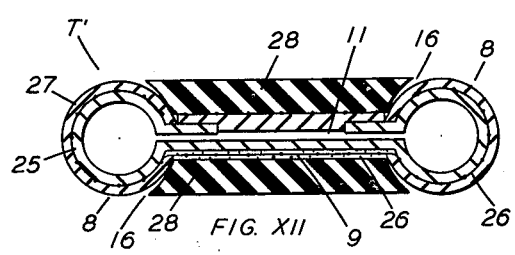
FIG. XII
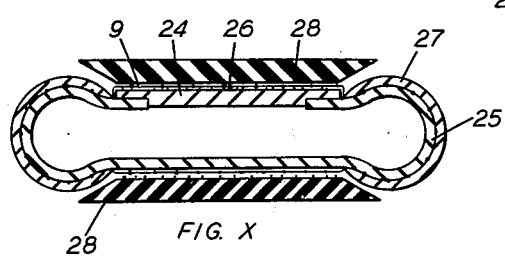
FIG. X
INVENTOR.
HULIE E. BOWERMAN
BY
ATTORNEY

2,985,195
QUICK ACTING CLUTCH TUBE

Hulie E. Bowerman, 904 Meadow Oaks, Arlington, Tex.

Filed Jan. 13, 1958, Ser. No. 708,614

3 Claims. (Cl. 137—788)

This invention relates to fluid actuated flexible sectioned tubes for clutches and brakes of the ring or disk type, the invention residing principally in the provision of such tubes of substantially minimum volume of interior cavity when in the closed or unactivated position and correspondingly of lower volume in all stroking positions than other tubes heretofore provided. These tubes may be used in conventional clutch and brake mechanisms (not shown), or when maximum stroke tubes are required these conventional mechanisms need be modified only to accommodate the correspondingly enlarged flex sections of my tubes as will be readily perceived by those skilled in the art.

A primary object of this invention is thus seen to be to provide an improved flexible inflatable tube having an elongated cross section which will operate with a minimum of air volume and yet which will withstand a considerable unit pressure during operation.

A further object is to provide an inflatable tube of the type described wherein the circular ends of the tube cross section are so constructed as to provide a considerably larger number of flexures without appreciable deterioration than may be obtained with conventional clutch tubes.

A still further object is to provide a flexible inflatable tube with a cross-section having an elongated flat center section and circular end sections wherein the flat sections are parallel and adjacent to reduce the volume between the flat sections to virtually zero and to reduce the internal cavity to a substantially minimum volume consistent with the desired end flexure.

Another object is to provide in a preferred form an inflatable flexible elongated cross-section tube having horizontal fillers installed on its upper and lower surfaces to provide a substantially flat external operating face to further reduce the amount of air required to engage the clutch or other operating mechanism.

An object of an additional embodiment of this invention is to provide in a preferred form an inflatable flexible elongated cross-section tube having horizontal fillers bonded to its upper and lower surfaces across the main portion of the mating horizontal areas except adjacent the circular ends at which point the filler is not bonded which permits free flexure at the ends and also permits the top flat surfaces of the fillers to move in and out parallel with each other and parallel to the surfaces they will engage.

And yet another object of this invention is to provide a novel method of manufacturing the tubes of this invention.

The construction and operation of the novel tube of this invention will be apparent from the following description together with the accompanying drawings in which:

Figure I is a top plan view of the tube of this invention.

Figure II is a section along line 2—2 of Figure I when the tube is deflated.

Figure III shows the section of Figure II in an inflated position.

Figure IV is a section similar to Figure II of another embodiment of the tube of this invention in its deflated position.

Figure V is a section similar to that shown in Figure IV except taken when the tube is in its inflated position.

Figure VI is a plan view of the tube of Figure I at the first step in its method of manufacture.

Figure VII is a cross sectional view along line 7—7 of Figure VI.

Figure VIII shows the section of Figure VII with a piece of flat cover in the process of being installed to complete the bladder portion of the tube.

Figure IX shows the section of VIII after a layer of fabric has been cemented in place about the periphery of the tube.

Figure X shows the section of Figure IX in the process of having an upper and lower filler and end covers installed.

Figure XI shows the completed section of the tube of one embodiment of this invention.

Figure XII shows the completed section of the tube of the embodiment of Figure IV of this invention.

In the several figures like references indicate similar parts wherein 5—5 are flat ring portions of my tube T as bearing surfaces to contact parts of a clutch not shown, one of which portions has spud or opening 6 communicative with cavity 7 between the flat portions 5 through which activating fluid may be introduced into and discharged from the tube as desired. About the inner and outer diameters of the flat portions, enlarged flex end sections 8—8 are integrally formed, preferablby reinforced by suitable cord or fabric 9 to withstand desired operating pressures within the tube. Within the flex sections there are provided circularly disposed cavities 10 of suitable sizes to provide flex sections readily accommodative of the desired stroking of the tube in a clutch. These cavities are but continuations of cavity 7 between the flat or bearing portions 5 of my tube T.

Spud 6 includes a hose or tube connecting means, in this case seen to be internal threaded opening 12 thru which the activating fluid is delivered into cavities 7 and 10 by way for convenience of channel 11 which distributes the fluid circumferentially, within the tube. When tube T is in its deflated position, the only cavity between the inner mating faces 13 of elongated center members 14 of the tube T is the very minimum channel 11. Consequently the fluid volume of the tube when deflated is substantially zero between the mating faces 13 and is substantially the minimum possible within the desired type of flexible end members 8.

When inflation occurs due to introduction of fluid F thru opening 12 of tube T as shown in Figure III, the inner cavities 7, 10, and 12 integrate into a continuous fluid volume under pressure and the tube T will inflate in the manner of least resistance which is thru the flexing of circular end members 8 and the outward movement of center members 14 in a nearly parallel manner. Since end members 8 have a large reinforced end circumference indicated at 15, there is very little tendency for the end members 8 to wear or crease during repeated operations.

The embodiment shown in Figures IV and V is identical to that shown in Figures 1–3 with the exception of the slot 16 which is left between end member 8' and center member 14' of tube T during the process of its manufacture. This slot 16 will permit the tube T' to be inflated to a maximum stroking position and yet not disturb the parallel relationship of center members 14'. The values of this feature are several, including: the distribution of pressure equally over the surface of center member 14' to equalize strain and wear; and over the surface of the clutch disk or other device against which tube T' operates to provide uniform engagement with an equalized load; additionally, the presence of slot 16 will further free the end membrs 8' of stress during expansion.

The novel method of manufacture of the tube of this invention may be seen by reference to Figures VI–XII inclusive to comprise basically the following steps:

(1) Molding an open face bladder 20 of continuous thickness flexible material (such as natural and/or synthetic rubber, both being referred to hereinafter as "rubber," plastics, and the like) into the shape shown in Figures VI and VII in a suitable mold at proper temperatures to effect vulcanization.

(2) Closing the open top gap 21 of bladder 20 by placing rubber cement 22 on adjoining edges 23 of bladder 20 and a flat cover 24 (which is of similar material to the tube; in one case, gum rubber), after conditioning both surfaces by roughening to retain the cement, and then pressing or rolling the adjoined surfaces to insure adhesion, thus forming a completed bladder 25 as shown in Figure VIII.

(3) Covering the circumference of the bladder 25 with a reinforcing fabric 9 such as heavy tire cord cloth (on a bias) as shown in Figure IX and cementing in place as 26; then preferably curing the bladder at this point.

(4) Adding end cover 27 and upper and lower fillers 28 as shown in Figure X and cementing in place. In one embodiment the fillers 28 are cemented to the bladder and end covers 27 across their entire mating surfaces as shown in Figure XI. In another embodiment the fillers are not cemented to the end covers adjacent the circular ends as shown in Figure XII leaving slot 16 open. In either embodiment, the completed tube T or T' is submitted to a final curing operation well understood in the art.

The fillers may be of metal, plastic or other materials than rubber. Also the faces of the clutch or brake structure may be so formed as to obviate the necessity of the fillers as shown, by the simple expedient of providing these structure faces of suitable contours to mate with the side or sides of the tube having other than flat center sections.

It will be observed that by providing flat parallel sections of my tube of such thickness and contour as to abut upon complete deflation the flex zones of my tube are protected from injurious creasing or line flexing. In preferred forms these flex zones are not depressed below normal or at rest positions of my tubes.

It is to be further noted that in the form of construction exemplified in Figures IV, V and XII the flat face sections upon stroking of the tube do not flex or follow the flex zones 8, nor are flex zones 8 limited in their free flexing by being bonded to the face sections.

From the foregoing description it will be readily seen that there has been produced a device as substantially fulfills the objects of the invention as set forth herein.

While this specification sets forth in detail the present and preferred construction of this invention, still in practice such deviations from such details may be resorted to as do not form a departure from the spirit of this invention as defined in the appended claims.

What I claim is:

1. A fluid actuated flexible inflatable bladder, comprising a toroid of elongated and flattened cross section including a fabric reenforced tube having parallel adjacent central members joined by enlarged substantially circular end members and externally extending therebeyond to define two opposed annular recessed areas substantially coextensive with the adjacent central members; flexible filler members bonded to the fabric reenforced tube and filling each recessed area even with the outermost periphery of the circular end members and complementary in shape to the contours of the adjacent central member and circular end members; and spud means mounted in a central member and passing outwardly through the adjacent filler member, said central members when the tube is deflated being close together and at least one of the central members having on its inner face channel means for circumferentially distributing the actuating fluid during inflation of the bladder.

2. A fluid actuated flexible inflatable bladder, comprising a toroid of elongated and flattened cross section including a fabric reenforced tube having parallel adjacent central members joined by enlarged substantially circular end members and externally extending therebeyond to define two opposed annular recessed areas substantially coextensive with the adjacent central members; flexible filler members bonded to the fabric reenforced tube and filling each recessed area even with the outermost periphery of the circular end members and complementary in shape to the contours of the adjacent central member and circular end members; and spud means mounted in a central member and passing outwardly through the adjacent filler member, said filler members being bonded only to the central members of the tube and being spaced from the end members by a very narrow void, whereby during inflation of the bladder the end members can flex without binding of the filler members.

3. A fluid actuated flexible inflatable bladder, comprising a toroid of elongated and flattened cross section including a fabric reenforced tube having parallel adjacent central members joined by enlarged substantially circular end members integral with the central members and externally extending therebeyond to define two opposed annular recessed areas substantially coextensive with the adjacent central members; a filler member bonded to the fabric reenforced tube at each central member and substantially coextensive therewith; and spud means extending into the bladder whereby the latter can be inflated with said fluid, the bladder when deflated having substantially zero fluid volume except in the end members and said end members flexing to a greater extent than the central members during inflation of the bladder whereby the filler members move away from each other in substantially parallel relation, said central members when the tube is deflated being close together and at least one of the central members having on its inner face channel means for circumferentially distributing the actuating fluid during inflation of the bladder.

References Cited in the file of this patent

UNITED STATES PATENTS

| | | |
|---|---|---|
| 1,097,595 | Roehrich | May 19, 1914 |
| 2,007,677 | Farmer | July 9, 1935 |
| 2,563,673 | Cardwell et al. | Aug. 7, 1951 |
| 2,612,909 | Keller | Oct. 7, 1952 |
| 2,666,007 | Hovey | Jan. 12, 1954 |
| 2,688,983 | Bowerman | Sept. 14, 1954 |
| 2,762,737 | Keller | Sept. 11, 1956 |
| 2,765,061 | Fawick | Oct. 2, 1956 |
| 2,839,440 | Pfeiffer et al. | June 17, 1958 |